US010367744B1

(12) United States Patent
Li et al.

(10) Patent No.: US 10,367,744 B1
(45) Date of Patent: Jul. 30, 2019

(54) SYSTEMS AND METHODS FOR NETWORK TRAFFIC ROUTING TO REDUCE SERVICE CONGESTION AT A SERVER (71) Applicant: Symantec Corporation, Mountain View, CA (US)

(72) Inventors: Qing Li, Cupertino, CA (US); Mark Molnar, Austin, TX (US); Joseph Chen, Manhattan Beach, CA (US); Ron Frederick, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/793,730

(22) Filed: Oct. 25, 2017

(51) Int. Cl.
| H04L 12/813 | (2013.01) |
| G06F 9/50 | (2006.01) |
| H04L 12/803 | (2013.01) |
| H04L 12/707 | (2013.01) |
| H04L 12/911 | (2013.01) |
| H04L 12/851 | (2013.01) |
| H04L 12/721 | (2013.01) |

(52) U.S. Cl.
CPC ............ *H04L 47/20* (2013.01); *G06F 9/5083* (2013.01); *H04L 45/22* (2013.01); *H04L 47/125* (2013.01); *H04L 47/825* (2013.01); *H04L 45/38* (2013.01); *H04L 47/2441* (2013.01)

(58) Field of Classification Search
CPC ....... H04L 47/20; H04L 47/825; H04L 45/22; H04L 47/125; H04L 45/38; H04L 47/2441; G06F 9/5083
See application file for complete search history.

(56) References Cited

U.S. PATENT DOCUMENTS

| 2011/0016180 | A1* | 1/2011 | Bharadhwaj | G06Q 10/10 709/205 |
| 2014/0362682 | A1* | 12/2014 | Guichard | H04L 41/5038 370/221 |
| 2015/0019686 | A1* | 1/2015 | Backholm | H04L 47/32 709/217 |
| 2015/0363244 | A1* | 12/2015 | Bott | G06F 9/541 719/328 |
| 2016/0041868 | A1* | 2/2016 | Davis | G06F 11/1008 714/773 |
| 2017/0208011 | A1* | 7/2017 | Bosch | H04L 47/25 |
| 2018/0060066 | A1* | 3/2018 | Rihani | G06F 8/71 |
| 2018/0295134 | A1* | 10/2018 | Gupta | H04L 63/10 |

* cited by examiner

Primary Examiner — Lakeram Jangbahadur
(74) Attorney, Agent, or Firm — FisherBroyles, LLP (57) ABSTRACT The disclosed computer-implemented method for network traffic routing to reduce service congestion at a server may include (1) receiving, by the computing device and from the cloud server, a traffic routing policy, (2) identifying, for a transaction and using at least one hook inserted into an operating system of the computing device, metadata describing a traffic type, (3) comparing the metadata with the traffic routing policy to determine the transaction is bypass traffic, and (4) sending the bypass traffic from the computing device to a destination other than the cloud server. Various other methods, systems, and computer-readable media are also disclosed.

17 Claims, 5 Drawing Sheets

SYSTEMS AND METHODS FOR NETWORK TRAFFIC ROUTING TO REDUCE SERVICE CONGESTION AT A SERVER

BACKGROUND

When network traffic is protected by a cloud-based security service, all network traffic routes through a cloud service provider for processing. However, not all network traffic requires processing by security services—this is particularly true with "all ports and all traffic" security. Thus, the cloud-based security service is a bottleneck for network traffic, and cloud operational costs are high due to the cloud-based security service having to contend with a large volume of network traffic. This is particularly a problem when end nodes access the cloud-based security service via a virtual private network (VPN) that requires a VPN concentrator and decryption at the cloud side. The instant disclosure, therefore, identifies and addresses a need for systems and methods for network traffic routing to reduce service congestion at a server.

SUMMARY

As will be described in greater detail below, the instant disclosure describes various systems and methods for network traffic routing to reduce service congestion at a server.

In one example, a method for network traffic routing to reduce service congestion at a server may include (1) receiving, by the computing device and from the cloud server, a traffic routing policy, (2) identifying, for a transaction and using at least one hook inserted into an operating system of the computing device, metadata describing a traffic type, (3) comparing the metadata with the traffic routing policy to determine the transaction is bypass traffic, and (4) sending the bypass traffic from the computing device to a destination other than the cloud server.

In some embodiments, the traffic routing policy may be at least one of: a new white list, a new traffic routing policy, and an update to a prior traffic routing policy received during enforcing the prior traffic routing policy. In some examples, the traffic routing policy may include at least one of: a reset requirement in response to specific metadata, a deny request requirement in response to specific metadata, a list of approved destinations to which to send the bypass traffic, and instructions to bypass the cloud server due to cloud server traffic load.

In further examples, the metadata may identify at least one of: a uniform resource locator, an internet protocol address, a fully-qualified domain name, a destination server name, an authenticated user, an authenticated user group, a source application, a destination application, a traffic category that does not require a security device, a streaming video, an approved traffic category, and a video genre.

In some embodiments, sending the bypass traffic from the computing device to a destination other than the cloud server may include at least one of: modifying a routing table, inserting routing entries into the operating system, forcing the bypass traffic to be sent via a specific physical network interface, and changing a media access control address of a destination of a packet of the bypass traffic. In some examples, sending the bypass traffic from the computing device to a destination other than the cloud server may include sending the bypass traffic using at least one of: a generic routing encapsulation tunnel, an internet protocol security virtual private network, a secure sockets layer virtual private network, and a virtual extensible local area network.

Moreover, the method may include sending the metadata to the cloud server as feedback for developing an update to the traffic routing policy. In some embodiments, the method may include sending traffic, other than the bypass traffic, from the computing device to the cloud server. In further examples, the method may include performing at least one security action in response to identifying the metadata.

In one embodiment, a system for network traffic routing to reduce service congestion at a server may include several modules stored in memory, including (1) a receiving module, stored in memory, that receives a traffic routing policy from a cloud server, (2) an identifying module, stored in memory, that identifies, for a transaction and using at least one hook inserted into an operating system of the system, metadata describing a traffic type, (3) a comparing module, stored in memory, that compares the metadata with the traffic routing policy to determine the transaction is bypass traffic, (4) a sending module, stored in memory, that sends the bypass traffic from the system to a destination other than the cloud server, and (5) at least one physical processor that executes the receiving module, the identifying module, the comparing module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, by the computing device and from a cloud server, a traffic routing policy, (2) identify, for a transaction and using at least one hook inserted into an operating system of the computing device, metadata describing a traffic type, (3) compare the metadata with the traffic routing policy to determine the transaction is bypass traffic, and (4) send the bypass traffic from the computing device to a destination other than the cloud server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for network traffic routing to reduce service congestion at a server. As will be explained in greater detail below, systems described herein may direct traffic including identified "clean transactions" through "direct-to-net" paths which bypass cloud servers (e.g., cloud servers providing cloud-based security services). Aspects of these techniques are based on the premise that all traffic need not be processed by cloud servers, thus "known good" traffic need not be routed through cloud servers and "direct-to-net" paths may be used when possible. For example, watching streaming videos may not require individual packets of video data to be analyzed by cloud-based security systems. Directing bypass traffic away from cloud servers reduces traffic at cloud servers, which mitigates bottleneck effects impacting cloud servers. In examples, clean transactions may be identified by using at least one hook inserted into operating systems of computing devices to identify various metadata attributes of traffic. Systems compare metadata with traffic routing policies to determine transactions are clean. Clean transactions are sent to a destination other than cloud servers, and thus bypass cloud servers to reduce cloud server loading.

In addition, the systems and methods described herein may improve the functioning of computing devices by automatically reducing network traffic routed to cloud-based security services. These systems and methods may also improve the fields of malware protection by improving speed and efficiency of cloud-based security services. Thus, the disclosed systems and methods may provide additional asset protection for common targets of malware, such as hospitals, shipping companies, financial companies, governments, etc. by reducing times needed to identify malware. A further benefit of the systems and methods described herein may be an improvement in a user experience due to higher network traffic throughput. In some examples, the systems and methods described herein may reduce cloud operational costs and/or increase efficiency of cloud-based security services.

Figure 1:
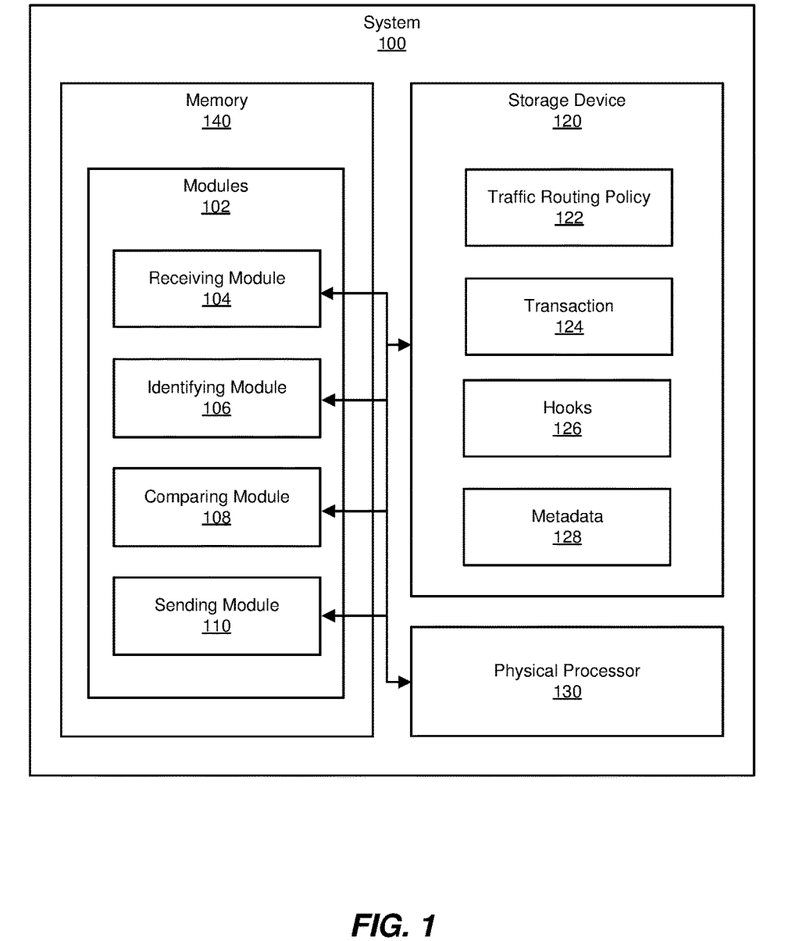
FIG. 1 is a block diagram of an example system for network traffic routing to reduce service congestion at a server.
Figure 2:
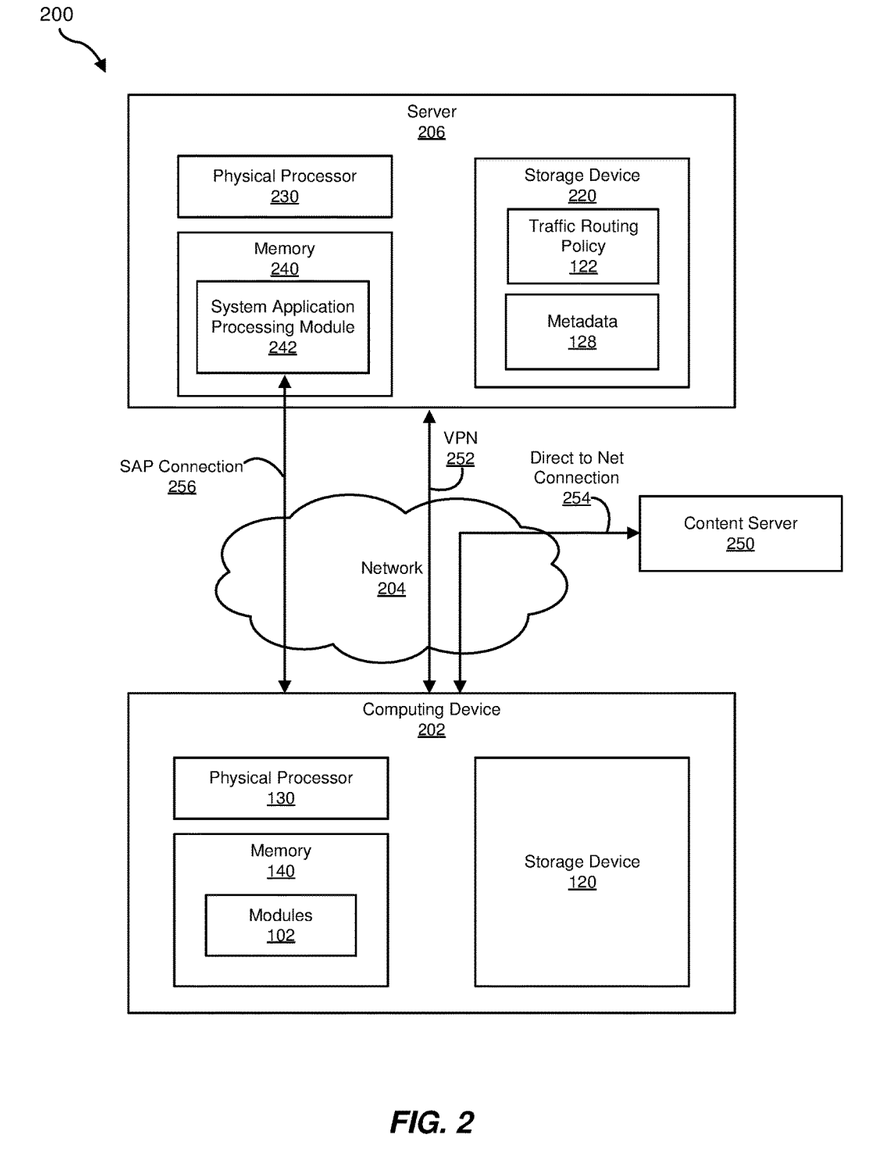
FIG. 2 is a block diagram of an additional example system for network traffic routing to reduce service congestion at a server.

The following will provide, with reference to FIGS. 1-2, detailed descriptions of example systems for network traffic routing to reduce service congestion at a server. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 4 and 5, respectively.

FIG. 1 is a block diagram of an example system 100 for network traffic routing to reduce service congestion at a server. As illustrated in this figure, example system 100 may include one or more modules 102 for performing one or more tasks. As will be explained in greater detail below, modules 102 may include a receiving module 104, an identifying module 106, a comparing module 108, and a sending module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more storage devices 120. Storage device 120 generally represents any type or form of volatile or non-volatile storage device or medium capable of storing data and/or computer-readable instructions. In one example, storage device 120 may store, load, and/or maintain one or more of traffic routing policy 122, transaction 124, hooks 126, and/or metadata 128. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate network traffic routing to reduce service congestion at a server. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to route network traffic to reduce service congestion at server 206. In examples, server 206 is a cloud-based server. For example, and as will be described in greater detail below, one or more of modules 102 may cause computing device 202 to (1) receive traffic routing policy 122 from server 206, (2) identify, for transaction 124 and using at least one hook 126 inserted into an operating system of computing device 202, metadata 128 describing a traffic type, (3) compare metadata 128 with traffic routing policy 122 to determine transaction 124 is bypass traffic, and (4) send the bypass traffic from computing device 202 to a destination other than the server 206, such as content server 250.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent a cloud-based endpoint device running server-side software, such as virtual private network encryption and/or decryption software. Additional examples of server 206 include, without limitation, security servers, application servers, web servers, storage servers, and/or database servers configured to run certain software applications and/or provide various cloud services, security, web, storage, and/or database services. Although illustrated as a single entity in FIG. 2, server 206 may include and/or represent a plurality of servers that work and/or operate in conjunction with one another.

As illustrated in FIG. 2, server 206 may also include one or more storage devices 220. Storage device 220 generally represents any type or form of volatile or non-volatile storage device or medium capable of storing data and/or computer-readable instructions. In one example, storage device 220 may store, load, and/or maintain one or more of traffic routing policy 122 and/or metadata 128. Examples of storage device 220 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, server 206 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more modules stored in memory 240. Additionally or alternatively, physical processor 230 may execute one or more modules to facilitate network traffic routing to reduce service congestion at a server. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, server 206 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more modules, such as system application processing (SAP) module 242. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

System application processing (SAP) module 242 generally represents any type or form of computer-executable instructions that may perform metadata 128, uniform resource locator (URL), fully-qualified domain name (FQDN), and/or internet protocol (IP) analysis to develop traffic routing policy 122. In examples, SAP module 242 may also distribute traffic routing policy 122 to computing devices, such as computing device 202. SAP connection 256 may provide a connection between SAP module 242 and network 204.

Content server 250 generally represents any type or form of computing device that reads computer-executable instructions. For example, content server 250 may represent an endpoint device running server-side software providing user content as part of transaction 124. Additional examples of content server 250 include, without limitation, security servers, application servers, web servers, storage servers, and/or database servers configured to run certain software applications and/or provide various security, web, storage, and/or database services. Although illustrated as a single entity in FIG. 2, content server 250 may include and/or represent a plurality of servers that work and/or operate in conjunction with one another.

Computing devices and servers may be connected with virtual private networks (VPNs) to provide secure transport of critical information. In FIG. 2, VPN 252 generally represents any medium or architecture capable of facilitating communication or data transfer via VPN.

Direct-to-net connection 254 generally represents any medium or architecture capable of facilitating communication or data transfer directly between computing device 202 and content server 250, without communication or data transfer being via server 206.

Figure 3:
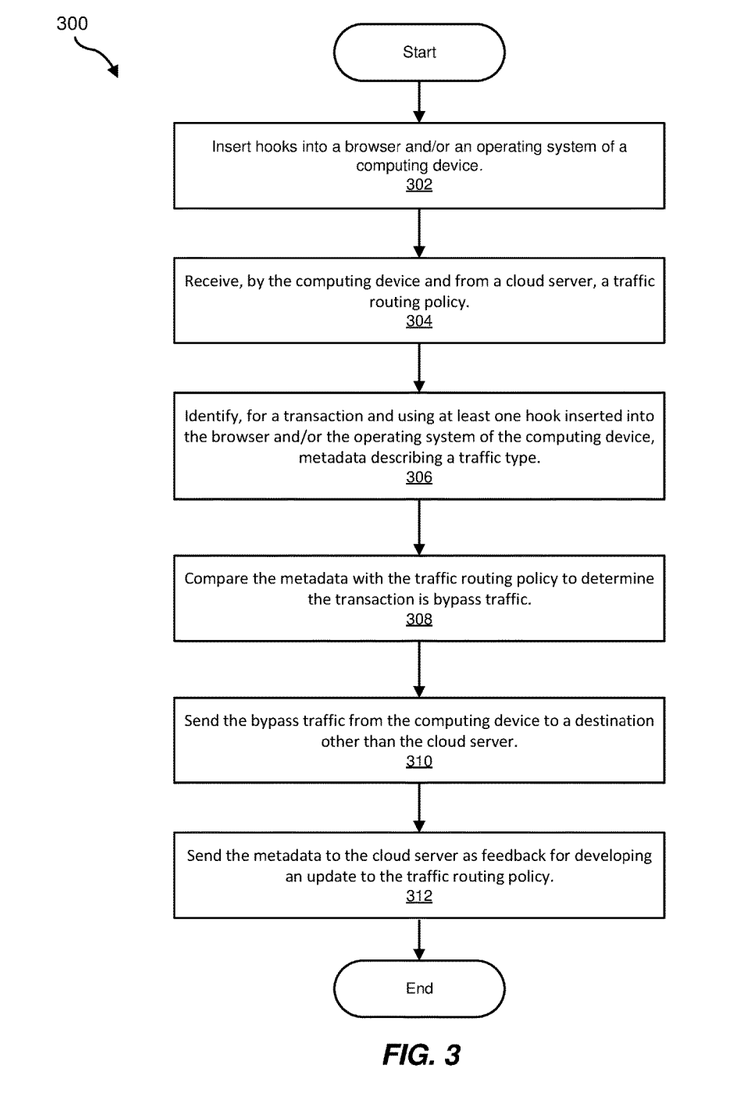
FIG. 3 is a flow diagram of an example method for network traffic routing to reduce service congestion at a server.

FIG. 3 is a flow diagram of an example computer-implemented method 300 for network traffic routing to reduce service congestion at a server. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may insert hooks into browsers and/or operating systems of computing devices. Hooks may include agent hooks, browser hooks, WINNET API hooks and/or connection table hooks. For example, processor 230 may, as part of server 206 in FIG. 2, insert hooks 126 into a browser and/or an operating system of computing device 202. In examples, computing device 202 in FIG. 2 receives hooks 126 from server 206 via VPN 252 and/or SAP connection 256.

Returning to FIG. 3, at step 304, one or more of systems described herein may receive traffic routing policies from servers such as cloud servers. For example, receiving module 104 may, as part of computing device 202 in FIG. 2, receive traffic routing policy 122 from server 206. In examples, computing device 202 in FIG. 2 receives traffic routing policy 122 from SAP module 242 via SAP connection 256.

In examples, traffic routing policy 122 may include instructions to route transaction 124 in a certain manner, based on metadata 128. In examples, traffic routing policy 122 may require routing transaction 124 in a manner that bypasses server 206, in response to metadata 128 indicating transaction 124 has certain characteristics (e.g., type of traffic). In some examples, traffic routing policy 122 may require routing transaction 124 in a manner that requires routing via server 206, in response to metadata 128 indicating transaction 124 has certain characteristics. In examples, traffic routing policy 122 includes at least one of a reset requirement in response to specific metadata 128, a deny request requirement in response to specific metadata 128, a list of approved destinations to which to send bypass traffic, and instructions to bypass server 206 due to traffic loading of server 206.

In examples, traffic routing policy 122 may change over time, and may include an initial (i.e., new) white list, an initial traffic routing policy, and updated white list, and/or an update to a prior traffic routing policy. The initial version of traffic routing policy 122 may be based on DNS requests passing through server 206 prior to sending the initial version of traffic routing policy 122 to computing device 202. For example, a cloud security service running on server 206 may examine a FQDN and a resolved address to decide a destination is "clean." In other examples, the cloud security service running on server 206 may examine metadata to determine of a policy exists—a lack of an applicable policy may indicate traffic redirection is necessary. In examples, computing device 202 in FIG. 2 receives an updated version of traffic routing policy 122 during enforcing a prior version of traffic routing policy 122—in other words, during runtime. Accordingly, server 206 may dynamically provision traffic routing policy 122 according to a real-time operating condition (e.g., loading) of server 206. This feedback loop may be bidirectional, as described herein with respect to step 312 in FIG. 3. Thus, computing power of computing device 202 participates in service operations to improve user experiences.

Returning to FIG. 3, at step 306, one or more of systems described herein may identify, for transactions and using hooks inserted into browsers and/or operating systems of computing devices, metadata describing traffic types. For example, identifying module 106 may, as part of computing device 202 in FIG. 2, identify, for transaction 124 and using hooks 126 inserted into the browser and/or the operating system of the computing device, metadata 128 describing a traffic type.

In examples, browser hooks identify, for transactions, metadata such as uniform resource locators (URL), an internet protocol (IP) addresses, user names, authenticated user groups, and/or authenticated user names. In examples, WINNET API hooks identify, for transactions, metadata such as IP addresses and/or fully-qualified domain names (FQDN).

In examples, metadata identifies destination server names, authenticated users, source applications, destination applications, traffic categories that do not require processing with security devices, streaming videos, approved traffic categories, and/or video genres.

Returning to FIG. 3, at step 308, one or more of systems described herein may compare metadata with traffic routing policies to determine transactions are bypass traffic. In examples, agent hooks in computing devices may enforce policy checkpoints. The comparing may include comparing metadata to "white lists" to designate transactions as bypass traffic. The "white lists" may also designate specific interfaces, top routers, and/or traffic routes through which to communicate bypass traffic. For example, comparing module 108 may, as part of computing device 202 in FIG. 2, compare metadata 128 with traffic routing policy 122 to determine transaction 124 is bypass traffic.

Returning to FIG. 3, at step 310, one or more of systems described herein may send and/or receive bypass traffic from computing devices to destinations other than cloud servers. In examples, connection table hooks in computing devices may modify route path and/or interface information. For example, sending module 110 may, as part of computing device 202 in FIG. 2, send and/or receive bypass traffic to/from a destination other than server 206, such as content server 250. In examples, computing device 202 in FIG. 2 sends and/or receives bypass traffic to/from content server 250 via direct-to-net connection 254.

In examples, sending the bypass traffic from computing device 202 to a destination other than server 206 may include modifying a routing table, inserting routing entries into the operating system of computing device 202, forcing bypass traffic to be sent via a specific physical network interface of computing device 202, and/or changing a media access control (MAC) address of a destination of a packet of bypass traffic. In examples, sending the bypass traffic from computing device 202 to a destination other than server 206 may include sending the bypass traffic using at least one of a generic routing encapsulation (GRE) tunnel, an internet protocol security virtual private network (IPSEC VPN), a secure sockets layer virtual private network (SSL VPN), and/or a virtual extensible local area network (VxLAN). In examples, sending the bypass traffic from computing device 202 to a destination other than server 206 may include caching results produced by step 308, such as mapping a URL to a route and/or mapping an IP address to a route so an agent may look up a destination IP address for an outbound connection and replace an outbound interface in a connection agent. In some examples, sending the bypass traffic from computing device 202 to a destination other than server 206 may include modifying a domain name server (DNS) response.

In examples, one or more of systems described herein may send and/or receive traffic other than bypass traffic to/from computing devices to cloud servers. For example, sending module 110 may, as part of computing device 202 in FIG. 2, send and/or receive non-bypass traffic to/from server 206, such as via VPN 252.

In examples, if higher layer information, such as actual URLs, are used to determine "cleanliness" of transactions, then initial Transmission Control Protocol (TCP) connections have already reached cloud servers and have been intercepted by cloud security services. In other words, transactions at a TCP level have been intercepted by proxies. In these cases, cloud security services transfer "ownership" of server-side connections to agents at computing devices. Agents at computing devices create internal connection objects and splice new internal connection objects with active connection objects for the transactions at the computing devices. For example, a video streaming website may provide user content categorized by various genres. Video streams of different genres may be distinguished by specific URLs. Allowed genres are identified and should bypass the cloud path. Transaction must first be intercepted and proxied in a cloud server. Once URLs for videos in allowed genres are submitted in transactions and analyzed, transactions may be bypassed and control over deciding to bypass or not are transferred to the computing device.

Returning to FIG. 3, at step 312, one or more of systems described herein may send metadata to cloud servers as feedback for developing updates to traffic routing policies. For example, sending module 110 may, as part of computing device 202 in FIG. 2, send metadata 128 to SAP module 242 as feedback for developing an update to traffic routing policy 122. In examples, server 206 analyzes extracted metadata 128 to determine allowed URL categories, safe URLs, and/or safe IP addresses, and updates updated traffic routing policy 122 accordingly.

A potential security risk associated with transaction 124 and/or metadata 128 may be identified, based on metadata 128, and, in response to identifying the potential security risk, a security action is performed in an attempt to ameliorate the potential security risk. In examples, identifying module 106 may identify a potential security risk associated with transaction 124 and/or metadata 128 and in response perform a security action in an attempt to ameliorate the potential security risk. The security action may include stopping transaction 124. The security action may include notifying server 206 that the potential security risk is associated with transaction 124 and/or metadata 128.

As explained above in connection with example method 300 in FIG. 3, provided are systems and methods for network traffic routing to reduce service congestion at a server. Systems described herein may direct traffic including identified "clean transactions" through "direct-to-net" paths which bypass cloud servers to reduce traffic at cloud servers, which mitigates bottleneck effects impacting cloud servers. In examples, clean transactions may be identified by using hooks inserted into browsers and operating systems of computing devices to identify various metadata attributes of traffic. Systems compare metadata with traffic routing policies to determine transactions are clean. Clean transactions are sent to a destination other than cloud servers, and thus bypass cloud servers to reduce cloud server loading. These techniques may improve the functioning of computing devices by automatically reducing network traffic routed to cloud-based security services. A further benefit of the systems and methods described herein may be an improvement in a user experience due to higher network traffic throughput. In some examples, the systems and methods described herein may reduce cloud operational costs and/or increase efficiency of cloud-based security services.

Figure 4:
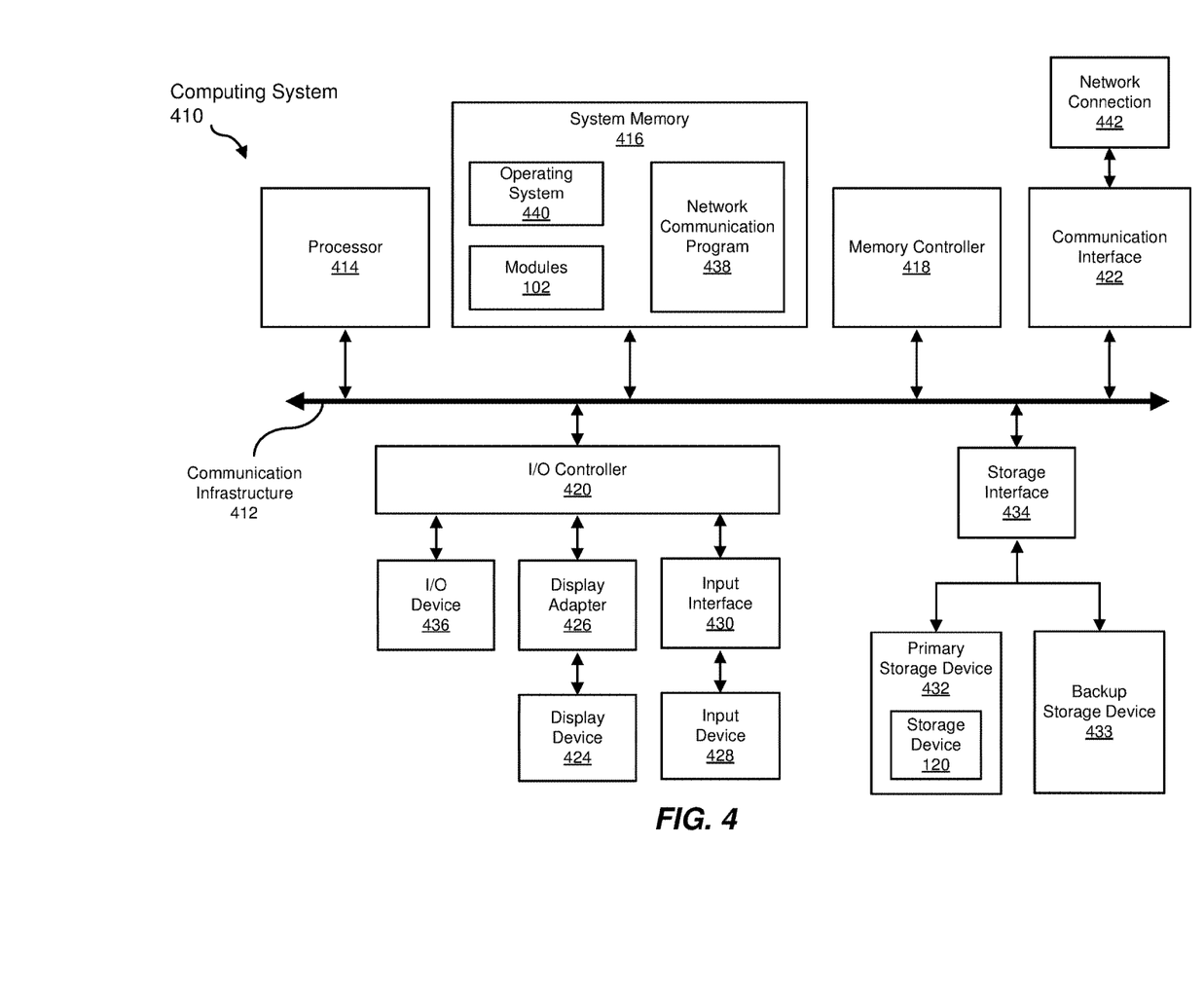
FIG. 4 is a block diagram of an example computing system capable of implementing one or more of the embodiments described and/or illustrated herein.

FIG. 4 is a block diagram of an example computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In some examples, system memory 416 may store and/or load an operating system 440 for execution by processor 414. In one example, operating system 440 may include and/or represent software that manages computer hardware and software resources and/or provides common services to computer programs and/or applications on computing system 410. Examples of operating system 440 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

As illustrated in FIG. 4, computing system 410 may also include at least one display device 424 coupled to I/O controller 420 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, example computing system 410 may also include at least one input device 428 coupled to I/O controller 420 via an input interface 430. Input device 428 generally represents any type or form of input device capable of providing input, either computer or human generated, to example computing system 410. Examples of input device 428 include, without limitation, a keyboard, a pointing device, a speech recognition device, variations or combinations of one or more of the same, and/or any other input device.

Additionally or alternatively, example computing system 410 may include additional I/O devices. For example, example computing system 410 may include I/O device 436. In this example, I/O device 436 may include and/or represent a user interface that facilitates human interaction with computing system 410. Examples of I/O device 436 include, without limitation, a computer mouse, a keyboard, a monitor, a printer, a modem, a camera, a scanner, a microphone, a touchscreen device, variations or combinations of one or more of the same, and/or any other I/O device.

Communication interface 422 broadly represents any type or form of communication device or adapter capable of facilitating communication between example computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

In some examples, system memory 416 may store and/or load a network communication program 438 for execution by processor 414. In one example, network communication program 438 may include and/or represent software that enables computing system 410 to establish a network connection 442 with another computing system (not illustrated in FIG. 4) and/or communicate with the other computing system by way of communication interface 422. In this example, network communication program 438 may direct the flow of outgoing traffic that is sent to the other computing system via network connection 442. Additionally or alternatively, network communication program 438 may direct the processing of incoming traffic that is received from the other computing system via network connection 442 in connection with processor 414.

Although not illustrated in this way in FIG. 4, network communication program 438 may alternatively be stored and/or loaded in communication interface 422. For example, network communication program 438 may include and/or represent at least a portion of software and/or firmware that is executed by a processor and/or Application Specific Integrated Circuit (ASIC) incorporated in communication interface 422.

As illustrated in FIG. 4, example computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, storage device 120 may be primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 410 may be configured as an Application Specific Integrated Circuit (ASIC) adapted to implement one or more of the example embodiments disclosed herein.

Figure 5:
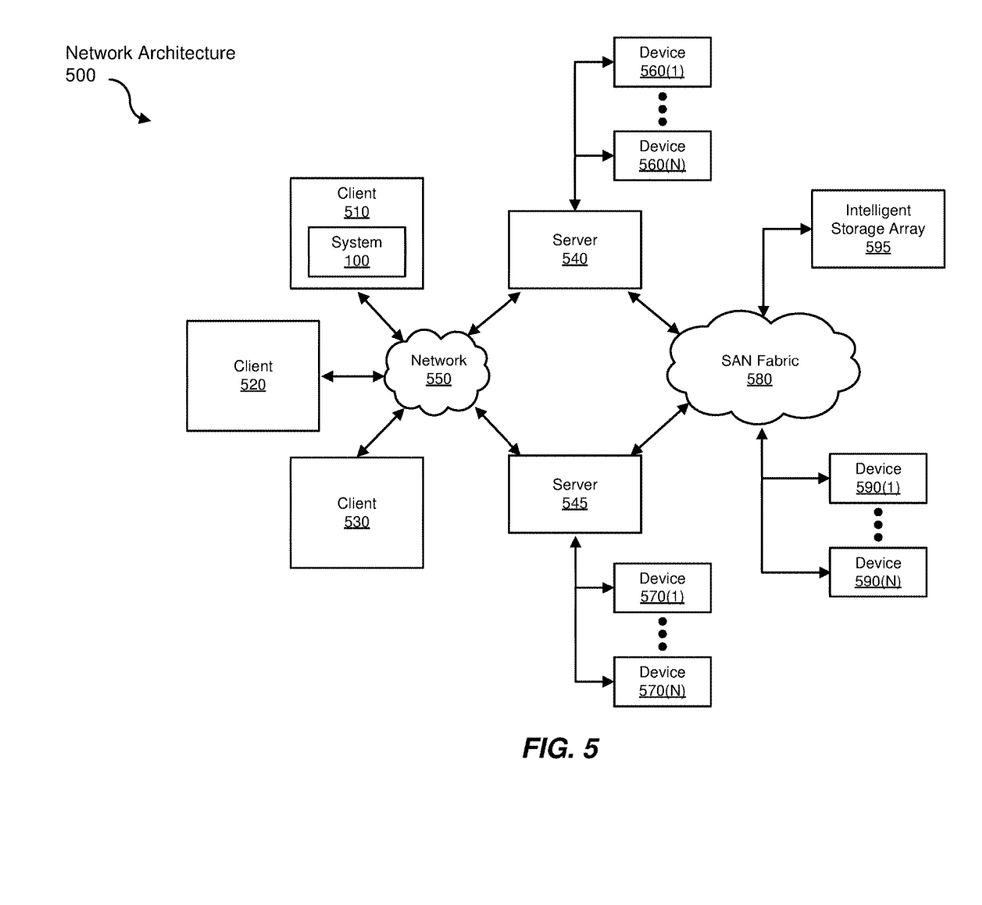
FIG. 5 is a block diagram of an example computing network capable of implementing one or more of the embodiments described and/or illustrated herein.

FIG. 5 is a block diagram of an example network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as example computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to example computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the example embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an example method for network traffic routing to reduce service congestion at a server.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive metadata to be transformed, transform the metadata, and use the result of the transformation to reroute transactions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for network traffic routing to reduce service congestion at a server, at least a portion of the method being performed by a computing device comprising at least one processor, the method comprising:
    receiving, by the computing device and from the cloud server, a traffic routing policy;
    identifying, for a transaction and using at least one hook inserted into an operating system of the computing device, metadata describing a traffic type;
    comparing the metadata with the traffic routing policy to determine the transaction is bypass traffic;
    sending the bypass traffic from the computing device to a destination other than the cloud server via a private network; and
    sending the metadata to the cloud server as feedback for developing an update to the traffic routing policy.

2. The method of claim 1, wherein the traffic routing policy is at least one of:
    a new white list;
    a new traffic routing policy; and
    an update to a prior traffic routing policy received during enforcing the prior traffic routing policy.

3. The method of claim 1, wherein the traffic routing policy includes at least one of:
    a reset requirement in response to specific metadata;
    a deny request requirement in response to specific metadata;
    a list of approved destinations to which to send the bypass traffic; and
    instructions to bypass the cloud server due to cloud server traffic load.

4. The method of claim 1, wherein the metadata identifies at least one of:
    a uniform resource locator;
    an internet protocol address;
    a fully-qualified domain name;
    a destination server name;
    an authenticated user;
    an authenticated user group;
    a source application;
    a destination application;
    a traffic category that does not require a security device;
    a streaming video;
    an approved traffic category; and
    a video genre.

5. The method of claim 1, wherein sending the bypass traffic from the computing device to a destination other than the cloud server includes at least one of:
    modifying a routing table;
    inserting routing entries into the operating system;
    forcing the bypass traffic to be sent via a specific physical network interface; and
    changing a media access control address of a destination of a packet of the bypass traffic.

6. The method of claim 1, wherein sending the bypass traffic from the computing device to a destination other than the cloud server includes sending the bypass traffic using at least one of:
    a generic routing encapsulation tunnel;
    an internet protocol security virtual private network;
    a secure sockets layer virtual private network; and
    a virtual extensible local area network.

7. The method of claim 1, further comprising sending traffic, other than the bypass traffic, from the computing device to the cloud server.

8. The method of claim 1, further comprising performing at least one security action in response to identifying the metadata.

9. A system for network traffic routing to reduce service congestion at a server, the system comprising:
    a receiving module, stored in memory, that receives a traffic routing policy from a cloud server;
    an identifying module, stored in memory, that identifies, for a transaction and using at least one hook inserted into an operating system of the system, metadata describing a traffic type;
    a comparing module, stored in memory, that compares the metadata with the traffic routing policy to determine the transaction is bypass traffic;
    a first sending module, stored in memory, that sends the bypass traffic from the system to a destination other than the cloud server via a private network;
    a second sending module, stored in memory, that sends the metadata to the cloud server as feedback for developing an update to the traffic routing policy; and
    at least one physical processor that executes the receiving module, the identifying module, the comparing module, the first sending module; and the second sending module.

10. The system of claim 9, wherein the traffic routing policy is at least one of:
    a new white list;
    a new traffic routing policy; and
    an update to a prior traffic routing policy received during enforcing the prior traffic routing policy.

11. The system of claim 9, wherein the traffic routing policy includes at least one of:
- a reset requirement in response to specific metadata;
- a deny request requirement in response to specific metadata;
- a list of approved destinations to which to send the bypass traffic; and
- instructions to bypass the cloud server due to cloud server traffic load.

12. The system of claim 9, wherein the metadata identifies at least one of:
- a uniform resource locator;
- an internet protocol address;
- a fully-qualified domain name;
- a destination server name;
- an authenticated user;
- an authenticated user group;
- a source application;
- a destination application;
- a traffic category that does not require a security device;
- a streaming video;
- an approved traffic category; and
- a video genre.

13. The system of claim 9, wherein the first sending module includes at least one of:
- a modifying module, stored in memory, that modifies a routing table;
- an inserting module, stored in memory, that inserts routing entries into the operating system;
- a forcing module, stored in memory, that forces the bypass traffic to be sent via a specific physical network interface; and
- a changing module, stored in memory, that changes a media access control address of a destination of a packet of the bypass traffic.

14. The system of claim 9, wherein the first sending module sends the bypass traffic using at least one of:
- a generic routing encapsulation tunnel;
- an internet protocol security virtual private network;
- a secure sockets layer virtual private network; and
- a virtual extensible local area network.

15. The system of claim 9, further comprising a third sending module, stored in memory, that sends traffic, other than the bypass traffic, from the computing device to the cloud server.

16. The system of claim 9, further comprising a security module, stored in memory, that performs at least one security action in response to identifying the metadata.

17. A non-transitory computer-readable medium comprising one or more computer-executable instructions that, when executed by at least one processor of a computing device, cause the computing device to:
- receive, by the computing device and from a cloud server, a traffic routing policy;
- identify, for a transaction and using at least one hook inserted into an operating system of the computing device, metadata describing a traffic type;
- compare the metadata with the traffic routing policy to determine the transaction is bypass traffic;
- send the bypass traffic from the computing device to a destination other than the cloud server via a private network; and
- send the metadata to the cloud server as feedback for developing an update to the traffic routing policy.

* * * * *